(12) United States Patent
Mayfield

(10) Patent No.: US 8,862,500 B1
(45) Date of Patent: Oct. 14, 2014

(54) AUTOMATED BILLBOARD TAGGING AND SELLING

(75) Inventor: Daniel R. Mayfield, Greater Seattle Area, WA (US)

(73) Assignee: Amazon Technologies, Inc., Reno, NV (US)

( * ) Notice: Subject to any disclaimer, the term of this patent is extended or adjusted under 35 U.S.C. 154(b) by 1171 days.

(21) Appl. No.: 12/372,622

(22) Filed: Feb. 17, 2009

(51) Int. Cl.
*G06Q 30/00* (2012.01)

(52) U.S. Cl.
USPC ..................................................... 705/14.58

(58) Field of Classification Search
USPC .............. 705/1, 14.58, 14.66, 14.73, 14.53, 705/14.49, 14.68; 709/207; 40/603, 590; 340/691.6, 988, 438, 468, 937; 348/E7.063, E7.069; 434/365
See application file for complete search history.

(56) References Cited

U.S. PATENT DOCUMENTS

| | | | |
|---|---|---|---|
| 2005/0004842 A1* | 1/2005 | Mammen | 705/14 |
| 2007/0124157 A1* | 5/2007 | Laumeyer et al. | 705/1 |
| 2009/0285492 A1* | 11/2009 | Ramanujapuram et al. | 382/209 |
| 2010/0004995 A1* | 1/2010 | Hickman | 705/14.58 |

* cited by examiner

*Primary Examiner* — Sun Li
(74) *Attorney, Agent, or Firm* — Kilpatrick Townsend & Stockton LLP

(57) ABSTRACT

Information pertaining to billboards and similar advertising spaces can be obtained using a plurality of capture devices positioned in vehicles traveling along various roadways. Information regarding the advertising spaces is determined from the images and stored in at least one data store. Image analysis and manipulation can be used to isolate images or image portions that potentially correspond to the advertising spaces, and these image portions can be presented to users who are able to quickly identify whether the image portion contains a billboard and, if so, the contents of that billboard. The information then can be analyzed in order to provide a billboard advertising system wherein advertisers can view billboard information and purchase advertising space without having to contact a broker or other intermediary.

25 Claims, 8 Drawing Sheets

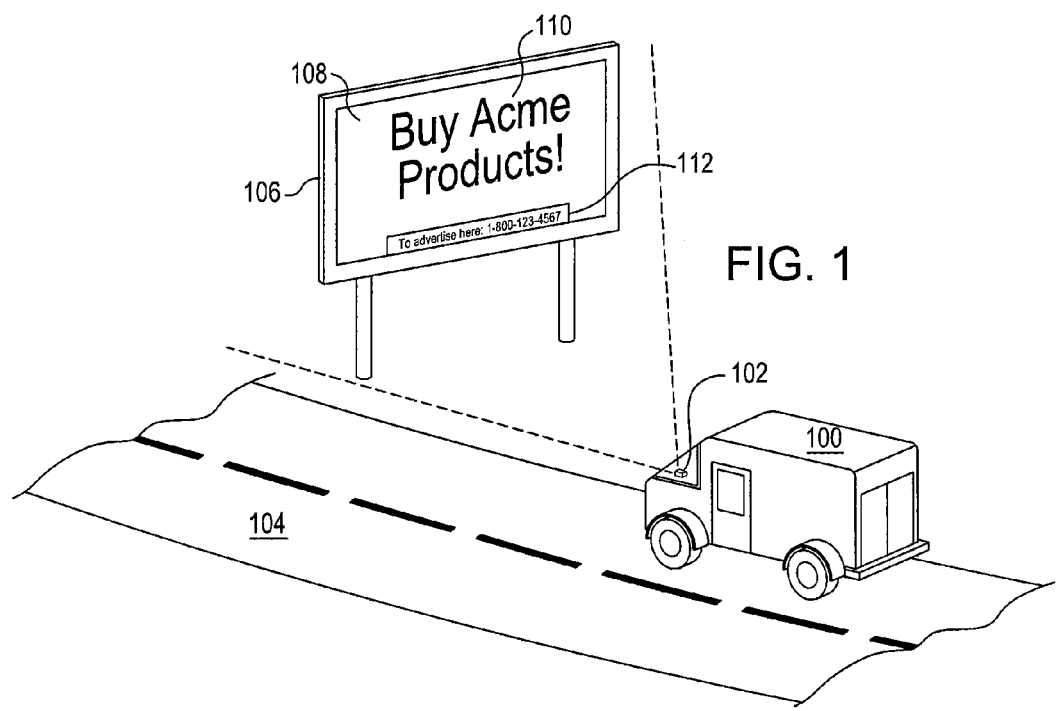
FIG. 1
FIG. 2
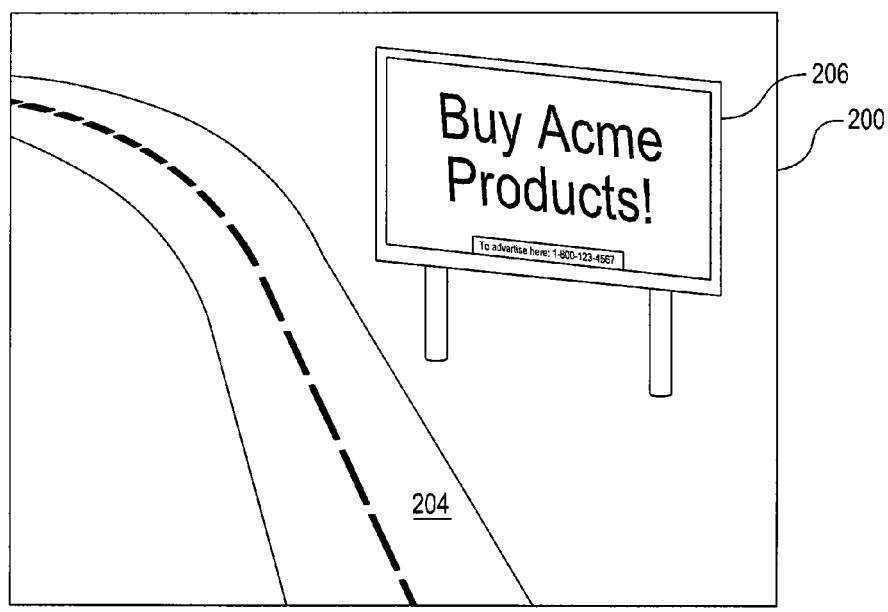

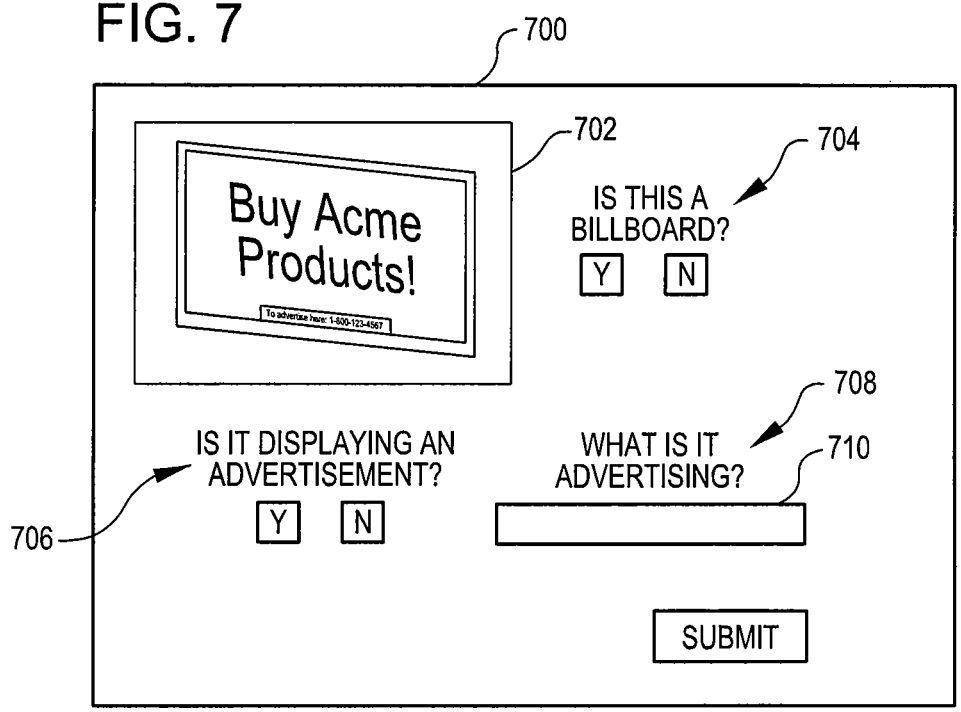

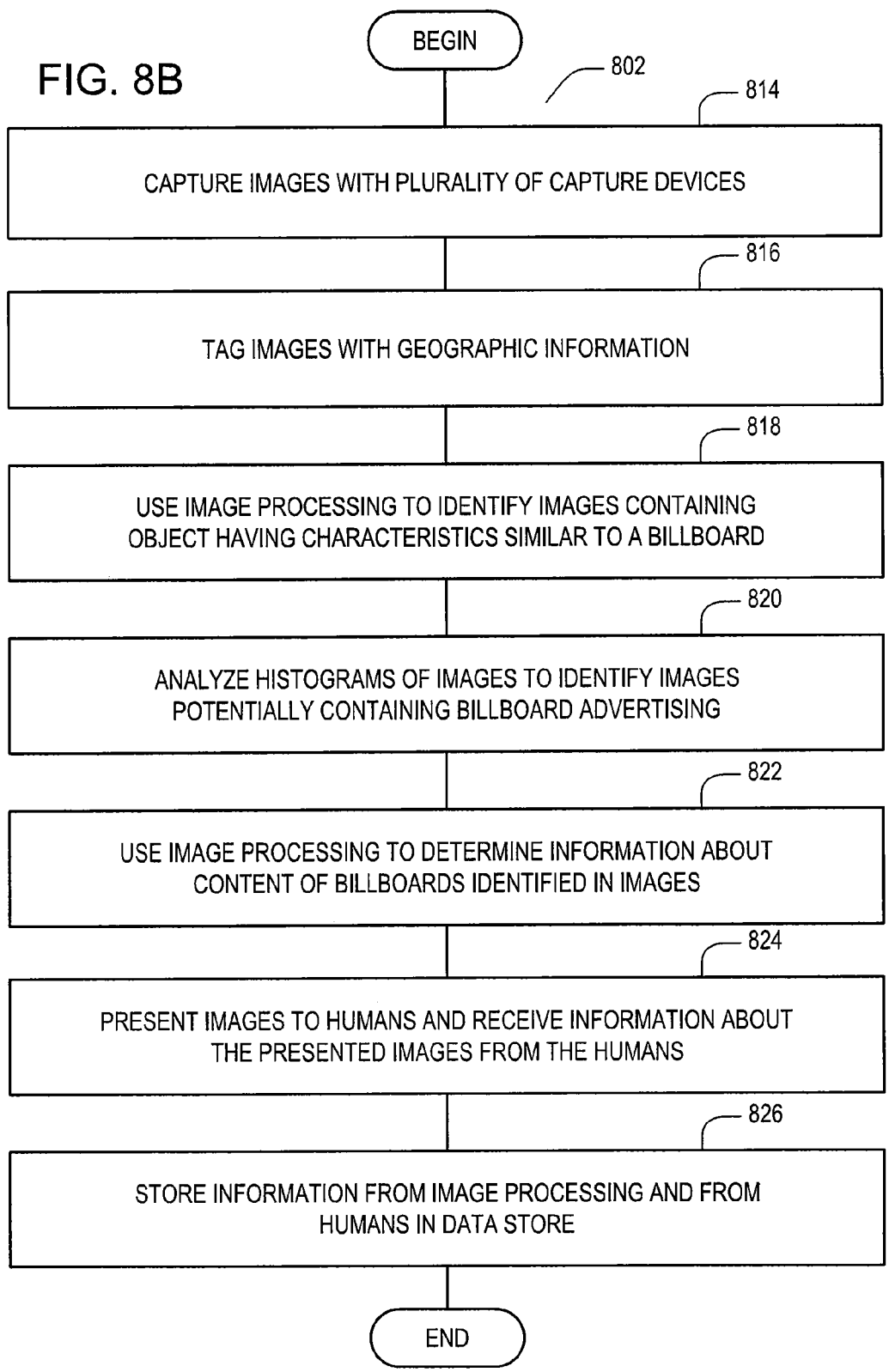

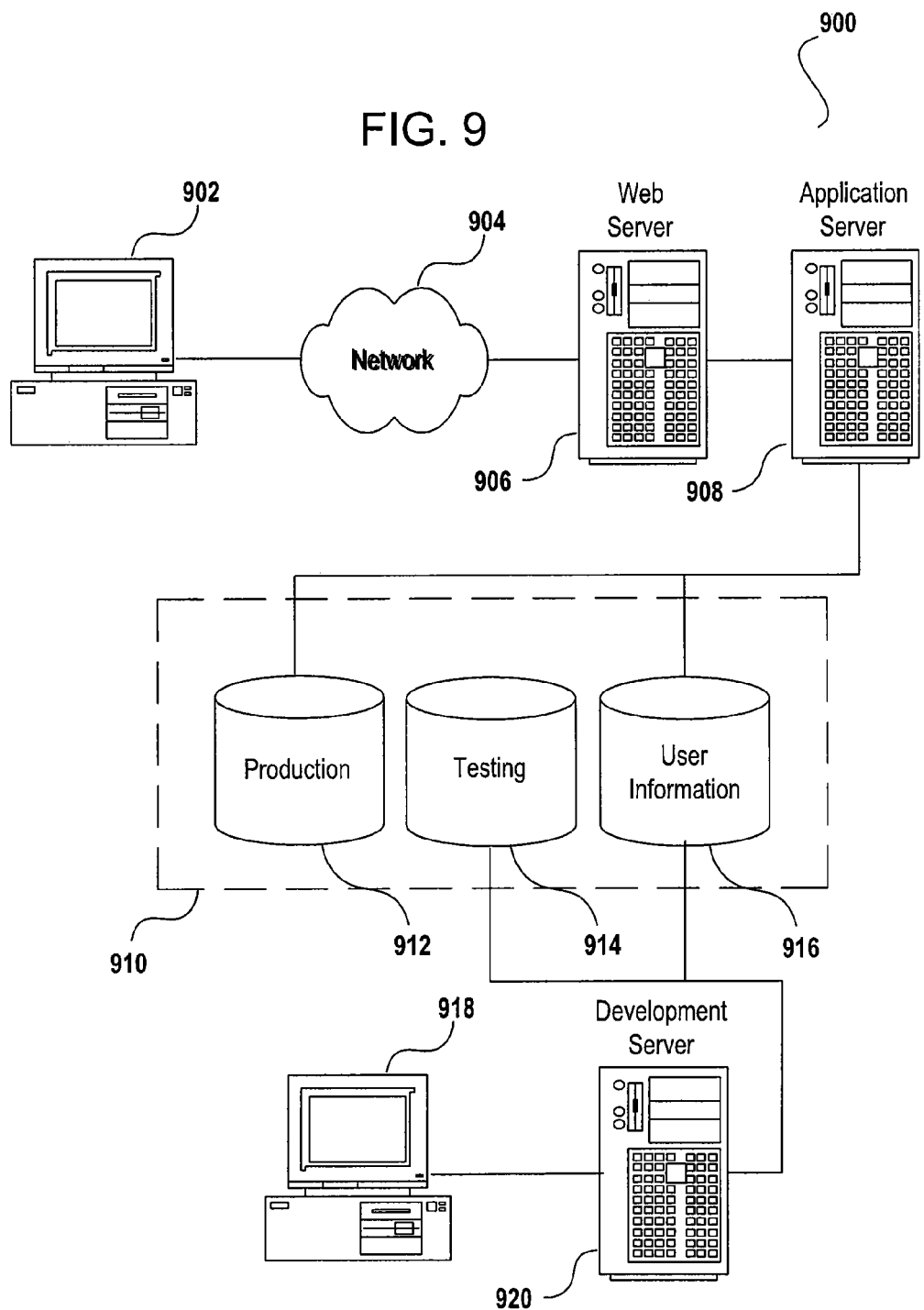

AUTOMATED BILLBOARD TAGGING AND SELLING

BACKGROUND

Advertising billboards are scattered throughout a variety of places. For example, billboards are located along highways and other roads so as to advertise products or services to drivers passing by the billboards. Billboards are also located in other areas, such as along railroad tracks, on the sides of buildings, and generally in any location where potential customers may pass by. As such, billboards present a major source of advertising revenue for media companies operating and controlling the billboards.

Billboards can be owned by individuals, companies, or other entities who are often assisted by brokerage firms who facilitate renting billboards to advertisers for specified periods of time. Typically, brokerage firms have relationships with the owners of billboards in a specific geographical region. Often, the brokerage firms employ one or more salespeople who interact with various advertisers by providing the advertisers with information regarding the availability, price, geographical location, and other relevant information. In regions where more than one brokerage firm operates the billboards, advertisers may have to contact multiple parties in order to rent billboard space over several billboards in a region.

Due in part to the fractured nature of the business, there are many billboards at any given time that are not being utilized simply because advertisers do not know about, or have access to information about, those billboards. Billboards can sit empty or unchanged for long periods of time. For example, a billboard may display a message such as "Advertise Here" and provide contact information for parties interested in renting or leasing the billboard. Another billboard may display an advertising message from the most recent advertiser to lease the billboard because the advertiser's lease ended and the billboard owner has not spent resources necessary to remove the old message and possibly replace it with another one. One reason billboards sit empty is due to the difficulty in conveying information about the availability of various billboards to potential advertisers, who cannot easily determine information such as the amount of traffic expected to pass by a particular billboard over a given period of time versus the cost of that billboard. Moreover, as advertisers often consider billboards as part of a broader advertising strategy, the difficulty in determining billboard availability in a larger, regional, national or other context, also can result in billboards sitting empty or advertising dollars not being optimized.

BRIEF DESCRIPTION OF THE DRAWINGS

Various embodiments in accordance with the present disclosure will be described with reference to the drawings, in which:

FIG. 1 illustrates an example of capturing billboard information using a capture device located on a truck;

FIG. 2 illustrates an image of a billboard captured by the capture device of FIG. 1;

FIG. 7 illustrates a display of an incentive feedback system that can be used in the environment of FIG. 4;

FIGS. 8A and 8B illustrate a method for marketing billboards, in accordance with an embodiment; and FIG. 9 illustrates an environment in which various embodiments can be implemented.

DETAILED DESCRIPTION

Figure 3:
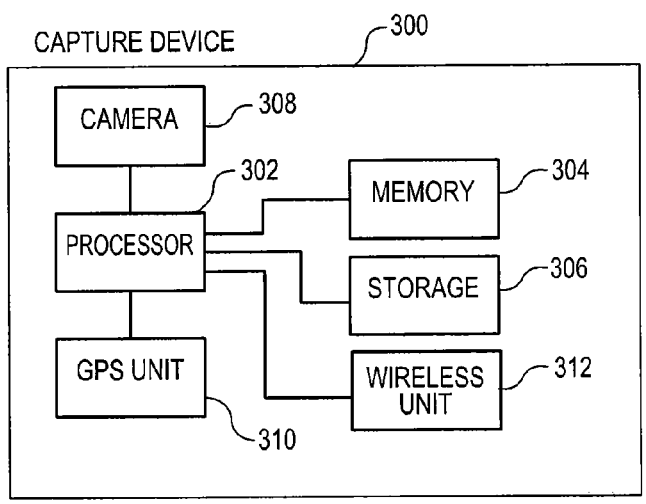
FIG. 3 illustrates components of a capture device that can be used in accordance with an embodiment.

Systems and methods in accordance with various embodiments of the present disclosure may overcome one or more of the aforementioned and other deficiencies experienced in conventional approaches to managing billboard space or conveying billboard information to potential advertisers. Systems and methods in accordance with various embodiments provide for the collection of billboard data utilizing image-capture devices that can be mounted onboard vehicles that frequently pass by billboards, such as freight trucks, delivery trucks and vans, trains, and other such vehicles. Data collected by the image-capture devices can be uploaded or otherwise transmitted to a system for analyzing the data, determining up-to-date billboard information, and facilitating transactions between billboard owners and advertisers.

In one example, capture devices are located on board a fleet of vehicles of a parcel delivery service. As each vehicle travels on various roads in order to make its deliveries, the corresponding onboard capture device might periodically capture at least one image of at least a portion of the view from front of the vehicle, such as three to four images every second, and store each image. The capture device might utilize a global positioning system (GPS), internal or external to the capture device, to tag each image with the geographical coordinates of the vehicle when the image was captured and possibly the direction to which the capture device was oriented, or the vehicle was moving, when the image was captured.

When each vehicle returns from making a series of deliveries, for example to be reloaded at a distribution center or parked during the night at a depot or parking garage, the images stored by the capture device might be uploaded to or through a base station or other receiving device in communication with a billboard marketing system. The billboard marketing system might process the images, such as by using edge detection algorithms, to determine which images contain billboards and which should be discarded or used for other purposes. In some embodiments the basic image processing is done on the vehicle, such that only images that potentially contain billboards are stored and subsequently uploaded to the billboard marketing system. The billboard marketing system might also gather, other data by analyzing the images, such as by extracting contact information for the owner of each billboard, which is often included on billboards and which can be ascertained with software having Optical Character Recognition (OCR) capabilities. Images determined to potentially include billboard information can be displayed to human users, who can quickly determine aspects of the image such as whether a billboard is actually shown (as opposed to a road sign or store front, for example), what a billboard in the image is advertising, whether the billboard is available, rented or leased, or permanently dedicated to a particular business, etc. Such details can otherwise be difficult or impossible to obtain reliably through automated mechanisms.

Using the data, the billboard marketing system might create dynamic maps that can be displayed to enable advertisers to view the locations of available billboards at any time. The billboard marketing system might provide a user interface that allows advertisers to view data about specific billboards, or groups of billboards, including data such as pricing information, physical characteristics, lease terms, and other information. The billboard marketing system might also facilitate offers by advertisers to rent or lease empty billboards, or to reserve billboards when they become available. The billboard marketing system might also provide an interface for billboard owners or brokers to offer their own billboards, enter information about billboards whose images have been captured by the billboard marketing system, respond to offers to rent billboards, or take any other appropriate action.

FIG. 1 illustrates a configuration in accordance with one embodiment wherein a truck 100 includes a capture device 102 mounted on a dashboard of the truck 100. It should be understood that, while the drawings show a delivery truck of the type often used by parcel delivery services, the truck 100 could be any vehicle, such as a freight truck, delivery van, passenger automobile, bus, train, or other vehicle that may pass by billboards, and any of a number of cameras can be positioned in any appropriate location on such a vehicle. Generally, images of billboards, or other similar advertising spaces, can be captured by any suitable device and not necessarily on a vehicle.

As shown in the drawing, the capture device 102 is located toward the front of the truck 100 and oriented such that, as the truck 100 travels down a road 104, the capture device 102 captures images of the area in front of the truck 100. One or more capture devices can also be located on the rear or other portion of the truck 100 and oriented to various directions. As billboards can be located on the left, right, or above the road 104, in an embodiment, one or more capture devices 102 can be configured to capture images such that each image contains the area left of the road 104, the area right of the road 104, and/or the area above the road 104. The capture device 102 can capture these areas in each image, or separate images can be taken of the areas where billboards are likely to be located.

In the example depicted in FIG. 1, the capture device 102 captures an image of the area in front of the truck 100, including a billboard 106 located on the right hand side of the road. As shown in the drawing, the billboard 106 can be a free-standing structure having a flat, substantially rectangular display surface 108 oriented towards drivers so as to display to the drivers advertisements, such as the advertisement 110 depicted in FIG. 1 reading "Buy Acme Products!" In general, billboards need not have a form as shown in the drawing, but can have various sizes and shapes, and can have features such as animation and three-dimensional advertisements. It should be understood that while various examples are discussed in connection with billboards, the current disclosure can apply to other similar advertising spaces as well, such as murals or other structures used to advertise.

Billboards often dedicate a small amount of space, such as a tag near the bottom of the billboard, to an ownership identifier which is often a logo, trademark, or name of the billboard operator and may include contact information for the owner or broker of a particular billboard so that advertisers can contact the owner or broker to inquire about renting. For example, the billboard 106 shown in FIG. 1 includes an ownership identifier 112, which is a small rectangular portion of the display surface 108 located along a bottom edge of the display surface 108 and containing the message "To Advertise Here: 1-800-123-4567" where 1-800-123-4567 is a telephone number for the owner or broker (collectively referred to as an operator) of the billboard 106. For other billboards, the ownership identifier can take other forms, such as a company logo of the billboard operator.

FIG. 2 shows an image 200 captured by a capture device, such as the capture device 102. In the example shown in the figure, the image 200 corresponds to an image taken by the capture device 102 in the truck 100 of FIG. 1, and includes a road 204 and a billboard 206 corresponding to the road 104 and billboard 106 of FIG. 1, respectively. In an embodiment, as shown in FIG. 2, an image 200 captured by the capture device includes areas adjacent both the left and right side of the road 204 (from the perspective of a driver of a truck in which the capture device is located) as well as an area above the road 204.

FIG. 3 illustrates a set of basic components of a capture device 300 such as the capture device 102 described with respect to FIG. 1. In this example, the device includes a processor 302 for executing instructions that are stored in a memory device or element 304. As known in the art, the capture device 300 can include many types of memory, data storage, or computer-readable media, such as a first data storage for program instructions for execution by the processor 302, a separate storage 306 for images or data, a removable memory for sharing information with other devices, etc. As discussed, the capture device 300 in many embodiments will include at least one imaging device such as a camera 308 able to capture images. The camera 308 can include any appropriate imaging element, such as a charge-coupled device (CCD) imaging element having a sufficient resolution, focal range, and viewable area to capture images of places in which billboards might be found, as described above. Methods for capturing images using a camera element with a computing device are well known in the art and will not be discussed herein in detail. It should be understood that image capture can be performed using a single image, multiple images, periodic imaging, continuous image capturing, image streaming, etc. Further the capture device 300 can include the ability to start and/or stop image capture, such as when receiving a command from a user, application, or other device.

As discussed, in accordance with an embodiment, the capture device 300 can also include a global positioning system (GPS) unit 310. As is known, the GPS unit 310 can receive signals from a plurality of satellites orbiting the Earth and process the signals to determine the approximate location of the GPS unit 310, and therefore, of the capture device 300 when the images were captured, relying on GPS location techniques as known in the art. In an embodiment, when the camera 308 captures an image, the GPS unit 310 calculates the approximate location of the image and sends the location to the processor 302, which stores the image in the storage in a manner allowing for identification of the image and the location in which the image was captured. For example, in an embodiment, the processor 302 stores the image and location in a data structure comprising a plurality of records in which corresponding images and locations are related to one another such that each image corresponds to a location. In some embodiments, the location information can be added to, or embedded in, the image data itself. In general, any method of associating captured images with corresponding locations can be used. Further, in an embodiment the GPS unit 310 periodically sends its current location to the processor 302 so that the processor 302 can determine whether it should direct the camera 308 to capture an image, as discussed below.

Also as discussed, in accordance with an embodiment, the capture device 300 can also include a wireless unit 312 for transferring data stored in the capture device 300 to another device for receiving the data. In an embodiment, the wireless unit 312 is programmed to search for wireless networks through which the capture device 300 can send stored data to a billboard marketing system. For example, if a truck is out on deliveries and the wireless unit detects a public Wi-Fi network, the wireless unit 312 might begin transferring data stored in the storage 306 to a billboard marketing system over the Internet or other communications network. If the wireless unit 312 becomes disconnected from the network before transferring a complete set of data, such as if the truck moves out of range of a network, the capture device 300 can be configured to send the remaining data upon being reconnected to the same or another network. In an embodiment, a distribution center or parking depot of an operator of the truck includes a wireless network to which the wireless unit 312 connects and transfers its data when the truck returns to the distribution center or parking depot, or otherwise comes within range, such as when the truck is finished being driven for the day or when the truck returns for reloading with additional packages or items.

The capture device 300 can also include components and/or features not listed above. For example, the capture device 300 can include instructions for capturing and processing images captured by the camera 308, such as by using image processing techniques described in more detail below. In an embodiment, the capture device 300 uses image processing algorithms, such as one or more of those discussed below, to determine whether each image has one or more characteristic indicative of a billboard being contained in the image. If an image does not have any characteristics indicative of a billboard, the image can be discarded in order to conserve storage space and reduce the number of images needed to be processed by other devices. As another example, the capture device 300 can include an input device, a display, a power supply, and/or ports for connecting to the capture device 300 with another device, such as with a personal or notebook computer.

Figure 4:
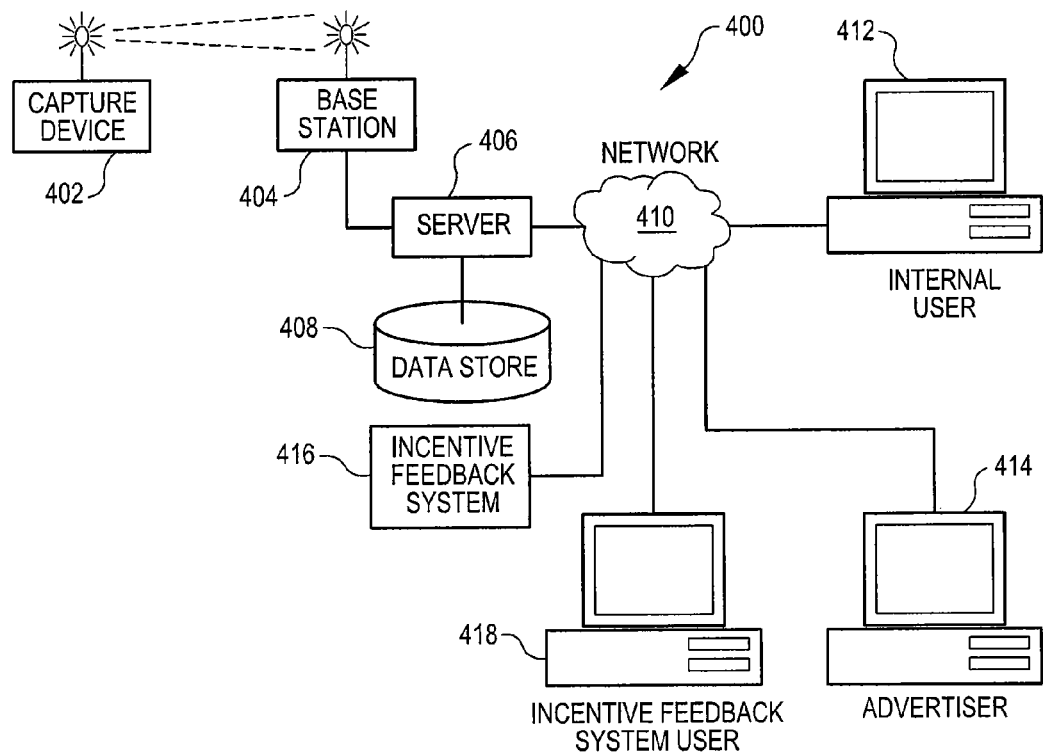
FIG. 4 illustrates an environment in which various embodiments can be implemented.

Once a billboard marketing system receives data from a capture device, various approaches can be implemented in various environments for various applications. For example, FIG. 4 illustrates an example of an environment for implementing aspects of a billboard marketing system 400 in accordance with various embodiments. Individual components of the billboard marketing system 400 can be similar to, or identical to, components discussed below in connection with FIG. 9. As discussed, the billboard marketing system 400 can receive data from a capture device 402, such as the capture device 300 discussed above, by way of a base station 404 configured to receive the data and pass the data to another component of the billboard marketing system 400. The base station 404 can include, for example, a wireless router or access point to which the capture device 402 is configured to connect, or any other mechanism for receiving data from the capture device 402, such as a web server configured to receive images from the capture device 402 over the Internet. While the drawing shows the capture device 402 communicating with the base station 404 by way of wireless transmission, it should be understood that any method of communicating data from the capture device 402 to the base station 400 can be used, such as by electrically connecting the capture device 402 to the base station 404 by way of a cable, or by physically transporting a computer-readable medium from the capture device 402 to the base station 404. Further, it should also be understood that in various embodiments, the base station 404 simply provides a conduit for the passing data to another portion of the billboard marketing system 400 that stores or processes the data. In various other embodiments, the base station 404 is configured to process data, such as by processing images to discard images that likely do not contain a billboard. The base station 404 may be a separate component of the billboard marketing system 400 or may be part of another component of the billboard marketing system 400.

As shown in the drawing, the billboard marketing system 400 can include a server 406, such as an application server, configured to facilitate communication with the base station 404, a data store such as a data store 408, and a network 410. While the example in the drawings shows a single server 406, it should be understood that the functions described as performed by the server, can be performed by a plurality of devices. In an embodiment, the network 410 includes the Internet and an intranet of a company operating the billboard marketing system 400, although the network 410 can be any suitable network, such as those described in connection with FIG. 9, below.

The server 406 can receive data from the base station 404 and store the data in a data store or other such repository 408. In an embodiment, the data store 408 includes mechanisms for storing images of billboards, respective geographical information for the billboards, information about the owners of the billboards or brokers operating the billboards, information about pricing and availability for the billboards, information concerning authorized users of the server 406, historical information about the billboards, price information for the billboards, and/or any other appropriate information. In addition, the server 406 can be accessed by a client device, such as by an internal user 412 connecting to the server 406 through the network 410 in order to view, update, and/or change contents of the data store 408.

For example, an advertiser 414 desiring to locate a billboard on which it may advertise can connect to the server 406 via the network 410 and provide login information which can include, for example, an account number and password. The server 406 can verify the login information with records stored in the data store 408, as is known. As discussed in more detail below, the server 406 can provide a graphical user interface to allow the advertiser 414 to input relevant search criteria, such as geographical location, price, the number of people who typically view a billboard in a specified time period, and/or other information useful in locating desirable billboards. Using the advertiser input, the server 406 can submit an appropriate query to the data store 408 to locate records stored in the data store 408 corresponding to billboards matching or nearly matching the advertiser-input criteria.

Additional users and/or components can access the server 406 via the network 410. For example, in an embodiment, an incentive feedback system 416 connects to the server 406 via the network 410. In an embodiment, the incentive feedback system 416 is a system allowing users, such as an incentive feedback system user 418 connecting to the incentive feedback system 416 via the network 410, to interact with data stored in the data store 408 in order to provide information that the billboard marketing system 400 can use to improve the contents of the data store 408.

In particular, while various image processing algorithms can be used to determine whether images captured by a capture device contain a billboard, these algorithms often have difficulty interpreting the information displayed on the billboard. In such cases, it can be beneficial to provide the information to users who can quickly and relatively accurately determine the contents of the billboard. Accordingly, as described in more detail below, the incentive feedback system 416 can allow people to view images captured by a capture device and provide information about the images, enabling a process of the incentive feedback system 416 to determine whether an image contains a billboard and, if so, information about what is displayed on the billboard. For example, in an embodiment, the incentive feedback system user 416 can be an individual who views images captured by a capture device and answers one or more questions about the image, such as whether the image contains a billboard and what is displayed on the billboard. In return for reviewing images and providing such information, the incentive feedback system user 418 can be provided with something of value (an incentive), such as money, coupons, discounts, store credit, points redeemable with one or more specific entities, frequent-flyer miles, merchandise, or other items of value. For instance, the incentive feedback system user 418 can be an individual who views images and provides information about the images in his or her spare time in order to earn points that are redeemable for items sold through one or more specific websites, electronic marketplaces, or physical stores. A specific incentive can be provided for each image viewed, for sets or groups of images viewed, for the amount of time spent viewing images, for the number of questions answered, or in any other appropriate manner. Users of the incentive feedback system 416 also need not be provided with an incentive or can be provided an incentive indirectly, for example, by being employed by an owner or operator of a billboard marketing system and having use of the incentive feedback system as a job-related duty. The incentive feedback system 416 can also include a third party who uses its own image processing techniques to provide information about captured images. Generally, the incentive feedback system 416 can include any mechanism that allows an operator of the billboard marketing system 400 to collect information about images.

As noted above, in an embodiment, the incentive feedback system 416 works in connection with automated processes, such as processes described in more detail below, to improve the contents of the data store 408. For example, the server 406, or other component of the billboard marketing system 400 not shown in the present example, can include one or more processes for processing images after the images are transferred to the base station 404 in order to find and discard or tag images that likely do not contain a billboard. For images that the server 406 determines have a significant chance of containing a billboard, an OCR or other such process can be used to ascertain the contents of the billboard and another process can apply a set of rules to classify portions of the content, such as advertisement content and information for an operator of the billboard. Further, as a single advertisement can be used on multiple billboards, the server 406 can include image recognition capabilities for comparing content of a billboard in a captured image with cataloged content in order to determine information about the billboard in the captured image.

The incentive feedback system 416, in an embodiment, shows images determined to have one or more characteristics indicative of a billboard to users of the incentive feedback system 416 to verify the information ascertained by the automated processes. For example, the incentive feedback system 416 can present questions to the incentive feedback system user 418 asking whether the image contains a billboard that displays a specific advertising message, where the specific advertising message had been determined through an OCR process. Information provided by the users can be used to correct contents of the data store 408 and to improve the automated processes. Further, images determined not to have one or more characteristics indicative of a billboard can be shown to humans to verify that the images do not contain billboards, in order to verify that automated processes are functioning properly, and to modify the processes if necessary.

In an embodiment, the incentive feedback system 416 is implemented on an application server, but can be implemented in a number of appropriate ways. Generally, the incentive feedback system 416 can include any appropriate number of servers, data stores, client devices, or other devices. Further, it should be understood that, while FIG. 4 shows the incentive feedback system as a component separate from the server 406, the incentive feedback system 416 can also be implemented on the server 406, or on another appropriate device.

Devices used in connection with the billboard marketing system 400, in various embodiments, can include additional features for ascertaining information about various billboards. For example, in an embodiment, the server 406 works in connection with the repository 408 to maintain information concerning a history of billboard content. Using this history, the server can ascertain information about various billboards. In an embodiment, for each of a plurality of billboards, the repository can maintain information about the billboard's content for each date an image of the billboard was captured. From this information, information about the billboard can be determined by the server 406 or another appropriate device.

In an embodiment, the server 406 includes instructions for determining how often the content of a billboard changes based on the information stored in the data store 408 and to determine an approximate date when a current lease on the billboard ends. If a billboard's content does not change for a period of time, but identical or similar content has been on other billboards whose content has changed, the server 406 can determine that the billboard with the unchanging content is likely available for lease at a low price and that the owner simply has not removed an old advertisement. Information obtained by the billboard marketing system concerning lease rates for billboards can be used to calculate estimates of lease rates for billboards, such as by comparing known rates for other billboards in a geographical location or along the same or similar road in order to estimate market prices. Billboard history information, such as how long a billboard has been without an advertisement, can be provided to advertisers to provide advertisers information from which they can determine whether a low offer to rent a billboard might be met with a favorable response. Such information gathered and calculated can be presented to potential advertisers. The advertisers then can use the billboard marketing system to present relatively low offers to billboard owners who might be willing accept the low offers, instead of not collecting any revenue from an un-leased billboard. The information can also be passed to billboard owners who can use the information in determining appropriate asking prices or deciding whether to accept an offer from an advertiser.

The billboard marketing system 400 can also include features for controlling the efficiency at which the billboard marketing system 400 operates. For example, as discussed, information about billboards is obtained, in one aspect, by capture devices located on vehicles that travel in locations where billboards are likely to be located. This process can involve many images, resulting in a large amount of information that is processed. One way of reducing the amount of information that needs to be processed is to include image processing capabilities, such as those discussed in more detail below, in the capture devices so that the capture devices filter and discard images that are unlikely to contain a billboard. In an embodiment, the capture device 402 uses one or more image processing techniques to detect an object that might be a billboard, and if the resolution of the object is not within a suitable range, such as when the object was far from the capture device when captured, the capture device 402 discards the image.

As another example, once information is collected about a billboard, it is not necessary that images of that billboard are captured every time a truck with a capture device passes by the location in which the billboard is located. Further, once a determination has been made that there are no billboards in a particular location, it is unnecessary to capture images of that location every time a truck with a capture device passes the location, but it might be suitable to capture an image of the location at a lesser frequency, such as once per month, in order to determine if a billboard has been constructed at that location. Accordingly, in various embodiments, the server 406 uses information in the data store 408 to determine locations that should be captured by the capture device 402 and passes appropriate instructions for capturing those locations to the capture device 402, such as by sending instructions from the base station 404. In an embodiment, the instructions include a list of geographical coordinates corresponding to the locations the capture device 402 should capture. These instructions can be uploaded to a device and/or vehicle each day, corresponding to the route to be followed by the vehicle along a delivery route, for example. Coordinates of locations in which billboards are known to be located can be stored in the data store 408. Likewise, coordinates of locations in which billboards that cannot be leased and the coordinates of road signs can be stored in the data store 408 so that instructions sent to the capture device do not include instructions to capture those locations or so that the billboard marketing system 408 has a record that a particular object is not a billboard that can be leased.

Other instructions, such as to capture images at a particular frequency in a specific geographic area, can also be given to the capture device 402. In an embodiment, advertisers or other users of the billboard marketing system 400 can input geographical coordinates of their own billboards and, in response to such input, the server 406 will send instructions to the capture device 402 to capture images at or around the coordinates. In an embodiment, the capture device is configured to provide requests to a driver of a vehicle in which the capture device 402. In this manner, the billboard marketing system 400 can provide instructions to the capture device 402 to request that the driver pass by a specific location, travel on a specific road, or take some other action. The request can be a visual or auditory alert to the driver, or can occur by interacting with a component of the driver's vehicle, such as with a GPS navigation unit of the vehicle used by the driver for navigation. As an example, the instructions sent to the capture device 402 can include a set of coordinates for various locations so that, if the processor of the capture device uses a GPS unit of the capture device to determine that one of the coordinates is within a short distance of a location included in the instructions, an alert is produced for the driver requesting that the driver divert his or her route to the location.

In some embodiments, the route that a driver is to follow on any given day can take into account the need for billboard information. For example, if there are three possible routes to get to a location, then the driver can be provided with suggested routes for any given day that will result in the driver passing by each billboard along one of the routes at the desired frequency. A process can take the need for such information into account when allocating packages or items to be delivered to different vehicles, and in determining the routes to be followed by each vehicle. Such a process also can take into account other factors, such as gas consumption, such that a route that is significantly longer and would result in lost time and extra cost to the company would be taken only when necessary to update billboard information.

Figure 5A:
FIGS. 5A and 5B illustrate examples of the image of FIG. 2 after being processed by image processing techniques.

FIG. 5A illustrates an example of how image processing processes can be used in connection with various embodiments. As an example, an image, such as the image 200 described above, can be edited in order to put the image in to a more desirable condition. As discussed above, image processing algorithms can be utilized on images captured by a capture device to identify images that are more likely to contain one or more billboards. As billboards are typically rectangular, in an embodiment, an edge detection algorithm is used on images captured by the capture device in order to identify images that possibly contain quadrilaterals or similarly shaped objects. If an image is identified as having a quadrilateral, for example, the image can be cropped in order to remove extraneous information from the image and cause only potential billboard candidates to be the subject of the image. For example, in the example shown in the drawings, image 200 has been cropped so that a quadrilateral formed by the edges of the billboard 502 occupies a large central portion of cropped image 500. In one embodiment, an edge detection algorithm, such as a Canny edge detector, or other detection algorithm or combination of algorithms, is used to detect lines that likely form a quadrilateral whose edges correspond to edges of the billboard 502, whereby the image can be cropped so as to have edges forming a rectangle whose dimensions are large enough to enable the billboard 502 to fit inside.

As billboards typically are located along the side of roads and in other places not directly in front of a moving vehicle, billboards appearing in images captured from a road will often not appear in the captured images as rectangles, resulting in edges of the cropped image 500 being larger than corresponding edges of the billboard 502. For instance, a rectangular billboard on the side of a road, such as the billboard 502, will often appear as a parallelogram as in a captured image as the billboard 502 will often not directly face the capture device. Therefore, in an embodiment the server 406 can be programmed to crop such an image so that the parallelogram formed by the edges of the billboard 502 fits within the cropped image 500. Extra space can be provided in the cropped image 500 in order to provide advertisers a portion of a view of the area surrounding the billboard 502. In addition, as billboards often are not perfectly rectangular, but include features extending beyond a rectangular frame of a billboard, extra space can be provided so that all or most of such features are likely to be included in the cropped image 500.

Generally, any of a number of image processing techniques can be employed individually, or in combination, in order to automatically ascertain whether captured images contain a billboard and, if so, the content of the billboard. As an example, as discussed above, a single advertisement might be used on several billboards in various locations. Accordingly, in various embodiments, the billboard marketing system stores advertisements in a data store so that portions of the captured images can be compared with contents of the data store so that a match indicates that an image contains a billboard. In this manner, content from the billboard in the image can also be ascertained immediately, such as the content of the advertisement. Such image processing techniques are known, for example in connection with facial recognition software, and, therefore, will not be discussed in detail.

As another example, as many road signs are green, a histogram of an object identified as a billboard can be taken to determine whether the object has a large amount of green and, therefore, is likely a road sign. Histograms can also be used to detect other characteristics common to objects that are not billboards, such as white speed-limit signs and orange construction signs, and can be used in other ways as well. In an embodiment, a histogram of each billboard is saved in the data store 408. By comparing the saved histogram with a histogram from an image of the same billboard captured at a later time, a determination can quickly be made as to whether the billboard's content has been changed, as the histograms would have changed accordingly. If billboard content has changed, a data store with billboard information can be updated accordingly, such as by updating content information and deleting information that is no longer current.

It should also be understood that, while the above description involves automatic edge processing techniques, manual techniques can be used instead of or in addition to automatic techniques. For instance, in an embodiment, users of a feedback incentive system, such as the feedback incentive system 416 described above, can process the images by manually cropping images presented to them that contain a billboard using features common in image processing software. This process can also be performed by advertisers with respect to their own billboards, by employees of a company operating a system for marketing billboards, or by any suitable person.

Figure 5B:

As noted above, more than one image processing technique can be used on images captured by a capture device in order to detect images that have a significant chance of containing a billboard. For example, FIG. 5B shows a rectified image 504 resulting from further processing of the cropped image 500. As discussed above, results of edge detection of an image can be used to determine a quadrilateral or other shape corresponding to edges of a billboard. A rectification algorithm can use the results to transform all points within the edges into a standard (such as rectangular) coordinate system so that, for rectangular billboards, vertical edges appear perpendicular to horizontal edges. For instance, in the example shown in the drawings, the billboard 502 captured by the capture device appears as a parallelogram in FIG. 5A as the billboard 502 was located on the side of a road when the image 500 was captured. The parallelogram detected by the edge detection algorithm and the contents of the parallelogram's interior can then be rectified so that the billboard 502 appears as rectangle, as in FIG. 5B, with minimal distortion of the contents of the billboard 500.

As another example, one or more convolution kernels can be applied to images captured by the capture device. In an embodiment, an appropriate sharpening convolution kernel is applied to images captured by the capture device in order to sharpen edges in the picture before processing by an edge detection algorithm. In general, any image processing technique or combination of techniques can be used in order to improve images captured by the capture device.

Figure 6A:
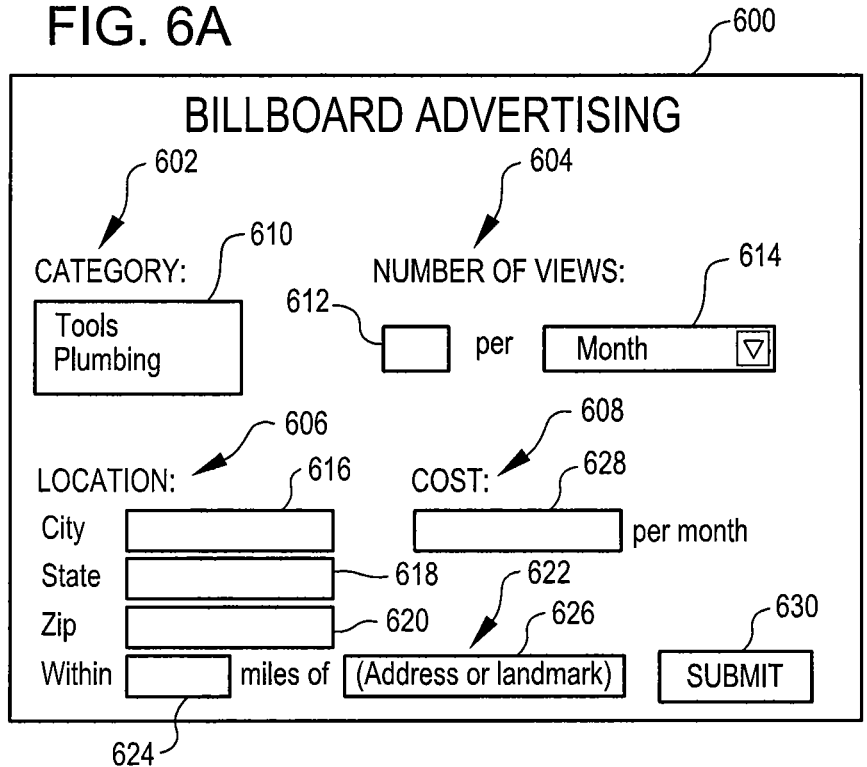
FIGS. 6A and 6B illustrate displays that can be presented to advertisers for the purpose of renting one or more billboards, in accordance with an embodiment.

As discussed, the billboard marketing system collects data about billboards and stores that data for use by various users of the billboard marketing system. In various embodiments, advertisers have the ability to search for billboards for various reasons, such as to locate billboards available for rent, for viewing advertising activity of competitors, and for devising overall advertising strategies. FIG. 6A illustrates features of a search page 600 of a user interface that can be used in connection with a billboard marketing system in accordance with various embodiments. In this example, the search page 600 is accessible via an Internet connection to an advertiser who has registered with the billboard marketing system, although other mechanisms for providing such a user interface to an advertiser can be used. Further, the search page or other portions of the user interface can be provided to other parties, such as billboard owners or members of the general public.

Different interfaces can be provided to different categories of users, such as advertisers and billboard owners, in order to provide each category with an optimized set of tools for searching for and viewing billboard information.

In accordance with various embodiments, the search page 600 can include various features enabling a user of the search page 600 to input or select one or more criteria used in searching for billboards. For example, in an embodiment, the search page includes a category feature 602, a visibility feature 604, a location feature 606, and a cost feature 608. Fewer features or more features can also be included.

The category feature 602, in an embodiment, includes a category text box 610 that allows advertisers to input one or more categories in order to search for billboards currently including advertisements related to the user-entered categories. In the example shown, "tools" and "plumbing" have been entered into the category text box 610, thereby indicating that a user intends to search for billboards currently advertising tools and/or plumbing goods and/or services. In this manner, an advertiser, for example, could search for billboards advertising goods and/or services similar to its own in order to choose billboards on which to advertise in accordance with a particular advertising strategy, such as advertising in areas where competitors are not advertising. Additional features can also be used with the category feature in order to provide additional criteria, such as geographical location, in order to produce more desirable results. Further, in an embodiment, the category feature need not be used in order to execute a search but, for example, the user could have location as the sole criterion.

The visibility feature 604, in an embodiment, includes a number entry field 612, which allows a user to input an integer corresponding to a number of views, and a time period drop-down field 614, which allows the user to select a time period for which the number entry field is to be applied. For example, in FIG. 6A, the time period drop-down field shows "MONTH" which means that any integer entered into the number entry field 612 will create a criterion that billboards on average have that number of views per month. Therefore, if 2500 was entered into the number entry field 612, a criterion would be created for a search request that specifies that billboards found in response to a search request should be seen by at least 2500 people per month.

The location feature 606, in an embodiment, includes a city field 616, a state field 618, a zip code field 620, and a radius field 622, each of which allows a user to specify a geographical property for search criteria. For example, in an embodiment, the city field 616 allows the user to enter a city in which the user wishes to search for billboards. Likewise the state field 618 allows users to enter states in which the user wishes to search for billboards and the zip code field 620 allows users to enters zip codes in which the user wishes to search for billboards. The radius field 622, in an embodiment, includes a radius entry box 624 and an address field 626. For example, a user can enter a number into the radius entry box 624 and an address or portion of an address into the address field 624 in order to search for billboards located within that number of miles of the address entered into the address field 624. The address field 624 can also include the ability to enter other information, such as landmarks, airport codes, or generally any information corresponding to a location around which a user wishes to search for billboards.

The cost feature 606, in an embodiment, includes a cost field 628 that allows a user to enter a number corresponding to a maximum monthly price billboards included in search results should have. For example, entering 1000 into the cost field 628 would create a criterion that billboards included in search results will have a cost of $1000 per month or less to lease.

As mentioned above, one or more features for creating search criteria, including the features described above, can be used simultaneously in order to provide more specific search results. Further, while the example in FIG. 6A shows specific features on a single page, it should be understood that the features need not be on a single page, or that a page may include different or additional features, such as mechanisms for selecting additional criteria or for weighing selected criteria so that certain criteria are treated as more important than others when a search is performed. Further, while the above example includes specific descriptions of mechanisms for inputting search criteria, other mechanisms can be used. For instance, drop-down boxes providing finite set of values from which to choose can be used instead of text input boxes, and radio buttons and/or checkboxes can be included to allows users to select from a list of features or criteria. Generally, any mechanism for allowing users to enter search criteria for billboards can be used.

When one or more criteria are selected, in an embodiment, a submit button 630 or other mechanism is provided to allow users to initiate a search for billboards in accordance with selected criteria. Once receiving indication that the submit button 630 has been selected, the billboard marketing system searches for billboards according to the criteria. In an embodiment, the billboard marketing system provides only billboards that match the selected criteria. In other embodiments, billboards that do not match all selected criteria can be provided. For example, if no billboards are found in a selected zip code that are within a selected price range, more expensive billboards can be provided within that zip code and/or billboards within the price range but in neighboring zip codes can be provided. Also, search results can be presented in an order according to how closely each result matches the selected criteria, with the results most closely matching the selected criteria appearing first. Generally, any method for providing search results according to user-selected criteria can be used in order to provide a user with one or more billboards matching the criteria.

Figure 6B:
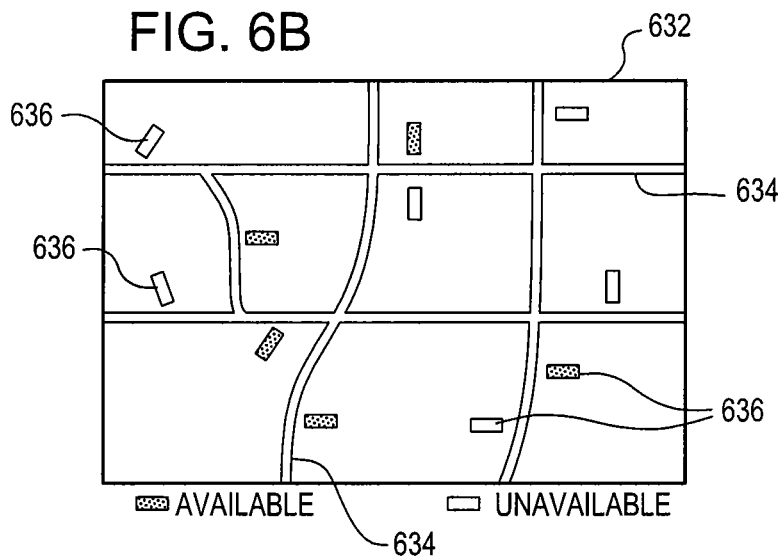

FIG. 6B illustrates a method of presenting search results to a user in accordance with various embodiments. In the example shown, a map 632 of a geographic location corresponding to user-selected criteria is provided is provided to the user. As shown, the map 632 can include a plurality of roads 634 and can show the location of one or more billboards 636 relative to the roads 634. For example, as shown in the figure, each billboard 636 is shown on the map 632 as a rectangle located on the map 632 in a location on the map 632 corresponding to the billboard's actual location, including in a location on the map 632 showing the side of the road 634 the billboard 636 is situated. In addition, various mechanisms for providing additional information about the billboards 636 on the map can also be utilized. For instance, as shown in the figure, billboards that are available for lease are shown as darkened rectangles while billboards that are unavailable for lease are shown as empty rectangles. The map 632 can only show billboards that match the user-selected criteria, or it can show all billboards within a particular geographical location while using color, shading, or other mechanisms for indicating which billboards match the user-selected criteria. In addition, the map 632 can also include interactive features, such as the ability to reduce or enlarge the geographic location shown, the ability to show or hide various elements of the map 632, the ability to scroll to adjacent geographic locations, the ability to select a billboard 636 and view more information about the billboard 636, such as an image of the billboard 636, or information about the billboard 636, such as the number of times the billboard 636 is viewed in a certain time period, the owner of the billboard 636, or the cost of the billboard 636. Further, methods of displaying search results other than on a map can also be presented to the user instead of or in addition to the map 632. For example, search results can be provided in list form, in table form, or in other ways.

The map 632 or other presentation of search results also, in accordance with various embodiments, allows a user to select one or more billboards and engage in a transaction with the owner(s) of the billboard(s). As one example, user selection of a billboard can result in the user being presented with a form for leasing the billboard according to an amount specified by the owner of the billboard, such as in instances where the owner has specified to the billboard marketing system a price he or she wishes, to receive to lease his or her billboard. As another example, user selection of a billboard can result in the user being presented with a form for offering to lease the billboard 636 at a price specified by the user. This can be useful in instances when a billboard does not include an advertisement or includes an old advertisement. The billboard marketing system or a person working therewith can contact the operator of the billboard, who may or may not have previously interacted with the billboard marketing system, to present the owner with an offer. In an embodiment, contact with the operator of the billboard is made by sending an electronic bid to the operator, such as through electronic mail, if an address to which the electronic bid can be sent is stored in the billboard marketing system, such as in instances where the operator has provided contact information to the billboard marketing system. In another embodiment, an employee of the billboard marketing system determines contact information of the billboard operator and places a telephone call to the operator in order to notify the operator about the bid and receive any counter offers from the operator. Generally, any way or combination of ways of notifying operators of billboards of bids for billboards can be used individually, or in combination. In many cases, agreements may be in place such that when an advertiser selects to advertise on a given billboard, the advertiser can simply upload or otherwise submit the image to be displayed and payment information, and the entire transaction can be completed online without human intervention. The image then can be printed and installed at the billboard at the appropriate start time. Electronic payment methods can be used to automatically transfer the funds and handle other aspects of the transaction as known in the art.

In addition, restrictions on billboard transactions can be built into a billboard marketing system so that contracts or intellectual property rights are not implicated. As an example, an operator of several billboards may have a contractual agreement with an advertiser that the operator will not lease billboards to competitors within a certain radius of a billboard leased by the advertiser. In various embodiments, billboard operator can input such restrictions into the billboard marketing system to that the system does not allow a competitor of the advertiser to make an offer on a billboard within the restricted radius. In an embodiment, for a particular billboard, the billboard operator can input a list of competitors of the advertiser and a radius, possibly infinite, within which the operator is prohibited from leasing billboards to any of the competitors. The billboard marketing system receives the list and radius and tags all billboards owned by the operator within the radius such that the billboard marketing system does not allow any of the competitors to make a bid on a tagged billboard.

As another example, the billboard marketing system, when presenting images of billboards to users, such as end-users including advertisers searching for billboards, the aforementioned image processing techniques can be used to remove content of the billboards such that copyrighted images on the billboards are not displayed to the user. In an embodiment, billboards are displayed to the users with no content, with sample content, or with an advertisement of the user stored in a data store of the billboard marketing system.

Other variations for searching for and displaying billboards are also within the spirit of the present disclosure. For instance, tools and features for managing advertising campaigns or portions of advertising campaigns can be included in a user interface provided to end-users of the billboard marketing system. The tools and features may be designed by or on behalf of the operator of the billboard marketing system.

In addition, tools may be provided to enable end-users to create or customize their own tools. For example, in various embodiments, an operator of the billboard marketing system publishes an application programming interface (API) or portion thereof in order to enable advanced users of the billboard marketing system to create or customize features of the billboard marketing system. Thus, in one example, a user can call the API directly in order to build advertising campaigns that proceed over time. For instance, an advertiser who rotates advertisements among a set of billboards can utilize the API to automatically lease or attempt to lease billboards of the set in a particular sequence, such as leasing a first billboard one month, leasing a second and third billboard another month, a fourth billboard after the lease on the second and third billboards ends, etc. As another example, advertisers can utilize the API to advertise certain products or services only in particular seasons. Advertisers can also build logic into features so that, for instance, a certain action is taken if a billboard becomes available at a certain time and another action is taken if the billboard does not become available. Other possibilities include customizing how search results are displayed and possibly combining data from other sources, such as a mapping service that provides images of a particular geographical area. Generally, a published API can be as limited or robust as the operator of the billboard operating system desires and the possibilities for using the published API are numerous.

As noted above, information used in search results can be gathered using various automated methods that extract data from images captured from a capture device, as described in more detail above, but that manual methods can be used in addition to or instead of the automated methods. For example, FIG. 7 illustrates features of an interface page 700 that can be used to ascertain information from images, such as in connection with the incentive feedback system 416 described above. The interface page 700 can be presented to a single user of the incentive feedback system or other system or can be presented to several users in order to allow for statistical analysis of information provided by the users in order to increase the reliability of the feedback provided by the users.

As shown, the interface page 700 includes an image 702 and provides for the input of various pieces of information concerning the image 702. In the example shown, the interface page 700 includes a billboard existence question 704, an advertisement existence question 706, and an advertisement content question 708. The billboard existence question 704 requests that a user specify whether the image 702 includes a billboard by selecting "Y" corresponding to "yes" or "N" corresponding to "no." Using information provided by the user or by several users responding to the billboard existence question 704, the billboard marketing system can identify the image 702 as an image containing a billboard.

Likewise, in an embodiment, the advertisement existence question 706 requests that a user specify whether a billboard 702 includes an advertisement by selecting "Y" or "N". As the advertisement existence question 706, in an embodiment, is only useful if the image 702 includes a billboard, the advertisement existence question 706 might only be presented in instances where a user has specified "Y" to the billboard existence question 704.

Similarly, if a user specifies "Y" to the advertisement existence question 706, the advertisement content question 708 might be presented to the user and, as shown in the figure, might include a text box 710 allowing the user to enter a description of the advertisement's content. For example, in the example of FIG. 7, a user might enter "ACME products."

Generally, the content of questions presented to a user of a feedback system used in connection with a billboard marketing system might depend on answers received in response to previous questions, thereby allowing the feedback system to drill down by asking only relevant questions and avoiding unnecessary questions. Further, questions different than those described above can be provide to users of the feedback system. Sample questions could include whether an object identified as a billboard is a road sign such as a speed limit sign, whether a billboard's advertisement is permanent (such as to advertise a theme park or other attraction located next to the billboard), whether the billboard contains a single unchanging advertisement, whether the billboard is a shutter-type billboard that periodically changes a displayed advertisement, whether the billboard is a television-type billboard, whether the billboard includes moving parts, whether the billboard is completely shown in the image, whether the billboard is a traditional freestanding billboard, whether the billboard is located on the side of a building, or any other relevant information that can be used in the billboard marketing system.

Figure 8A:
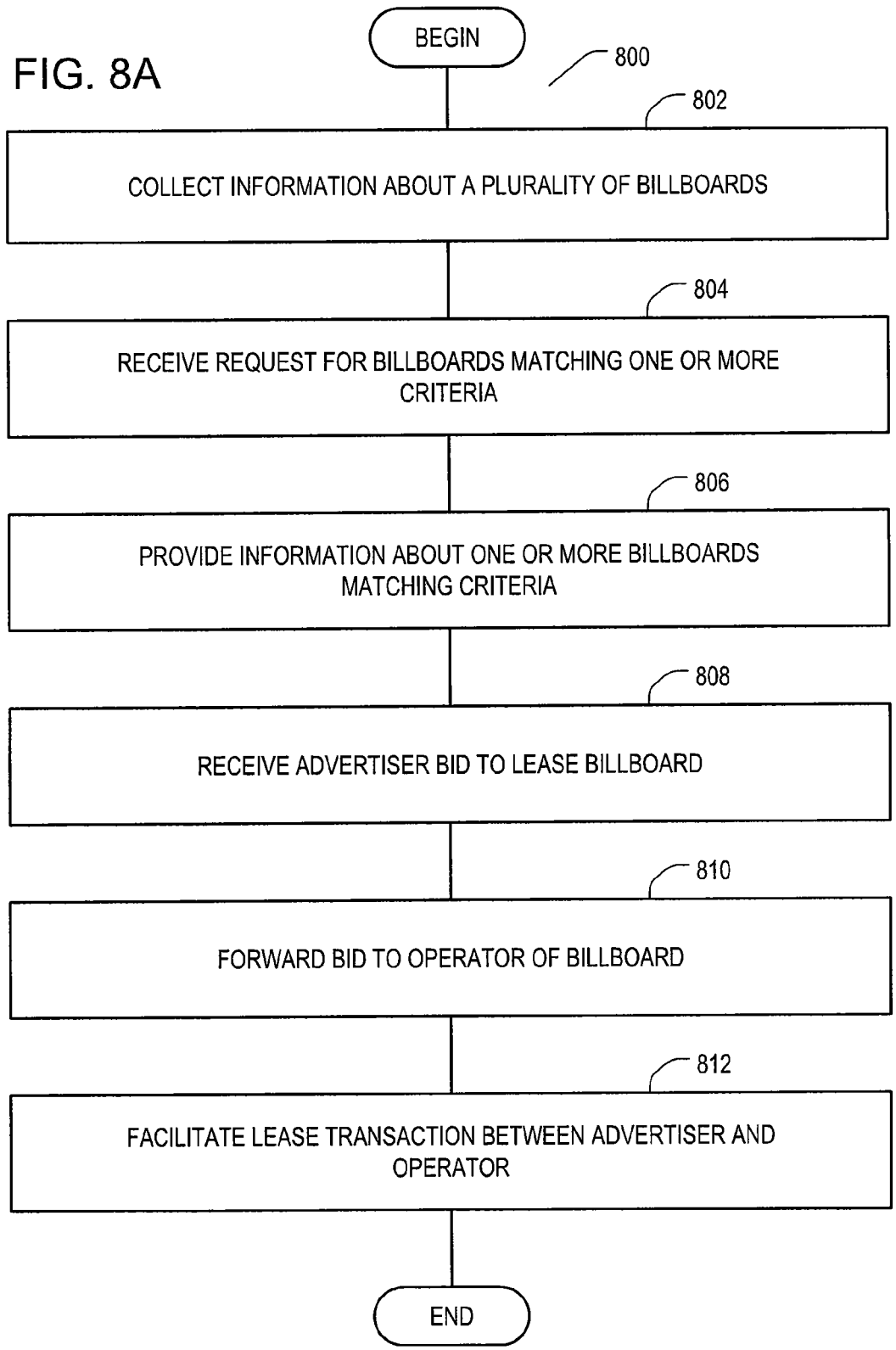

Various methods can be employed in order to market billboards in accordance with the present disclosure. FIGS. 8A and 8B, for example, show a method for marketing advertising space, in accordance with various embodiments. The steps of the method can be performed in accordance with details described above, but can also vary in accordance with various embodiments. Further, while the method disclosed shows the steps performed in a particular order, it should be understood that the order of the steps can be varied. Also, in various embodiments, not all steps will be performed and one or more steps may be performed several times.

In accordance with various embodiments, FIG. 8A shows a method 800 for marketing billboards or other advertising spaces. At an information collection step 802 information about a plurality of billboards is collected. The information can be collected, for example, as described above by analyzing images captured by a plurality of capture devices, or by receiving information from billboard operators over a communications network, or in other ways. Once the information is collected, a request for billboards matching one or more criteria provided by a user is received at a search request step 804. The criteria can be provided for various purposes, such as for locating available billboards, for locating low-cost billboards, or for locating competitors billboards. The criteria can be provided by various users, such as by advertisers, by billboard operators, or others. Information about billboards matching the criteria is provided to the user at a results step 806. In an embodiment, the results step 806 includes performing a search of a data store to locate billboards matching the criteria. The results step 806 can also include providing information about billboards that do not match the criteria exactly, but that are determined according to an algorithm that is designed to provide the user with relevant information, such as information concerning billboards that closely match the user's criteria.

In an embodiment, at a bid step 808, a bid to lease a billboard, such as one of the billboards corresponding to information provided at the results step 806, is received from an advertiser interested in leasing the billboard. At a bid forwarding step 810, the bid to lease the billboard is forwarded to the operator of the billboard for consideration. In alternate embodiments, the bid forwarding step 810 may not include forwarding the bid to the operator of the billboard, but may instead include comparing the bid with information that is stored in a data store, such as information corresponding to the minimum price the operator of the billboard is willing to receive in order to lease the billboard. A transaction between the user providing the bid and the operator of the billboard can be facilitated at a transaction facilitation step 812. The transaction facilitation step, in various embodiments, can include one or more ways of facilitating a transaction, such as providing a mechanism for negotiating lease terms between the advertiser and operator, communicating negotiation results to the operator and advertiser, receiving funds from the advertiser to lease the billboard, passing funds to the operator to lease the billboard, receiving a commission or other payment for facilitating the transaction, and the like.

FIG. 8B illustrates the information collection step 802 in greater detail, in accordance with various embodiments. As discussed, information about billboards and other advertising spaces can be collected in a variety of ways, such as by collecting and analyzing images, and by receiving information about billboards from advertisers and/or from billboard operators. In an embodiment, the information collection step 802 includes capturing images with a plurality of capture devices at a image capturing step 814. The image capturing step 814 can be completed in various ways, such as by capturing images with one's own capture devices, receiving images captured by others, providing something of value in exchange for images captured by others, and the like. At a geographical tagging step 816, one or more images are tagged with geographical information corresponding to the location where the images were captured. The geographical tagging step, as above, can include receiving geographical information from a GPS unit and/or from billboard operators who know the location of their own billboards. Information such as information corresponding to the direction a capture device was headed when capturing a billboard can also be included in the geographical information. In one embodiment, a capture device includes a compass unit that provides information corresponding to the orientation of the capture device when images are captured. Other ways of providing geographic information, such as by estimating a trajectory of the capture device using GPS data, can also be used.

Image processing techniques are used to identify images containing an object, such as a quadrilateral, that has characteristics similar to those of a billboard at a first image refinement step 818. As noted above, the first image refinement step 818 can be performed on one or more capture devices or on a computing device that has received the images from the capture devices. Images not identified as having an object whose characteristics similar to those of a billboard can be discarded or stored in a data store for various purposes. At a second image refinement step 820, the objects identified as having characteristics similar to billboards are further analyzed in order to identify which of those objects are likely billboards. For example, the second image refinement step 820 can include analyzing a histogram of each object, or of each image, and comparing the histogram with information stored in a data store. In this manner, at the second image refinement step 820, images that potentially contain billboards can be separated from images containing street signs or other objects that share characteristics common with billboards. For those images potentially containing billboards, the histograms of the potential billboards can be used to identify content of a billboard, for example, by comparing the billboard's histogram with histogram's of advertisements stored in a data store at a content extraction step 822. The content extraction step 822 can include the use of other image processing techniques, such as OCR and other techniques used to match portions of an image with information stored in a data store, as described above.

Information about images and the content of any billboards contained therein can also be ascertained at a feedback step 824, which can include presenting images to humans and receiving information about the presented images from the humans. The feedback step 824, for instance, can include the use of an incentive feedback system, as described above, or other system. The feedback step 824 can be used to verify content ascertained at the content extraction step 822 or to ascertain content from images for which the content extraction step 822 did not ascertain any content. Information about the images, such as information ascertained at the content extraction step 822 and/or the feedback step 824 is stored in a data store at a data storage step 826. The data storage step 826 can also include storing other information, such as image data and geographical data, historical data, and, generally, any data.

As discussed, various approaches can be implemented in various environments for various applications. For example, FIG. 9 illustrates an example of an environment 900 for implementing aspects in accordance with various embodiments. As will be appreciated, although a Web-based environment is used for purposes of explanation, different environments may be used, as appropriate, to implement various embodiments. The environment 900 shown includes both a testing or a development portion (or side) and a production portion. The production portion includes an electronic client device 902, which can include any appropriate device operable to send and receive requests, messages, or information over an appropriate network 904 and convey information back to a user of the device. Examples of such client devices include personal computers, cell phones, handheld messaging devices, laptop computers, set-top boxes, personal data assistants, electronic book readers, and the like. The network can include any appropriate network, including an intranet, the Internet, a cellular network, a local area network, or any other such network or combination thereof. Components used for such a system can depend at least in part upon the type of network and/or environment selected. Protocols and components for communicating via such a network are well known and will not be discussed herein in detail. Communication over the network can be enabled by wired or wireless connections, and combinations thereof. In this example, the network includes the Internet, as the environment includes a Web server 906 for receiving requests and serving content in response thereto, although for other networks an alternative device serving a similar purpose could be used as would be apparent to one of ordinary skill in the art.

The illustrative environment includes at least one application server 908 and a data store 910. It should be understood that there can be several application servers, layers, or other elements, processes, or components, which may be chained or otherwise configured, which can interact to perform tasks such as obtaining data from an appropriate data store. As used herein the term "data store" refers to any device or combination of devices capable of storing, accessing, and retrieving data, which may include any combination and number of data servers, databases, data storage devices, and data storage media, in any standard, distributed, or clustered environment. The application server can include any appropriate hardware and software for integrating with the data store as needed to execute aspects of one or more applications for the client device, handling a majority of the data access and business logic for an application. The application server provides access control services in cooperation with the data store, and is able to generate content such as text, graphics, audio, and/or video to be transferred to the user, which may be served to the user by the Web server in the form of HTML, XML, or another appropriate structured language in this example. The handling of all requests and responses, as well as the delivery of content between the client device 902 and the application server 908, can be handled by the Web server. It should be understood that the Web and application servers are not required and are merely example components, as structured code discussed herein can be executed on any appropriate device or host machine as discussed elsewhere herein. Further, the environment can be architected in such a way that a test automation framework can be provided as a service to which a user or application can subscribe. A test automation framework can be provided as an implementation of any of the various testing patterns discussed herein, although various other implementations can be used as well, as discussed or suggested herein.

The environment also includes a development and/or testing side, which includes a user device 918 allowing a user such as a developer, data administrator, or tester to access the system. The user device 918 can be any appropriate device or machine, such as is described above with respect to the client device 902. The environment also includes a development server 920, which functions similar to the application server 908 but typically runs code during development and testing before the code is deployed and executed on the production side and is accessible to outside users, for example. In some embodiments, an application server can function as a development server, and separate production and testing storage may not be used.

The data store 910 can include several separate data tables, databases, or other data storage mechanisms and media for storing data relating to a particular aspect. For example, the data store illustrated includes mechanisms for storing production data 912 and user information 916, which can be used to serve content for the production side. The data store also is shown to include a mechanism for storing testing data 914, which can be used with the user information for the testing side. It should be understood that there can be many other aspects that may need to be stored in the data store, such as for page image information and access right information, which can be stored in any of the above listed mechanisms as appropriate or in additional mechanisms in the data store 910. The data store 910 is operable, through logic associated therewith, to receive instructions from the application server 908 or development server 920, and obtain, update, or otherwise process data in response thereto. In one example, a user might submit a search request for a certain type of item. In this case, the data store might access the user information to verify the identity of the user, and can access the catalog detail information to obtain information about items of that type. The information then can be returned to the user, such as in a results listing on a Web page that the user is able to view via a browser on the user device 902. Information for a particular item of interest can be viewed in a dedicated page or window of the browser.

Each server typically will include an operating system that provides executable program instructions for the general administration and operation of that server, and typically will include a computer-readable medium storing instructions that, when executed by a processor of the server, allow the server to perform its intended functions. Suitable implementations for the operating system and general functionality of the servers are known or commercially available, and are readily implemented by persons having ordinary skill in the art, particularly in light of the disclosure herein.

The environment in one embodiment is a distributed computing environment utilizing several computer systems and components that are interconnected via communication links, using one or more computer networks or direct connections. However, it will be appreciated by those of ordinary skill in the art that such a system could operate equally well in a system having fewer or a greater number of components than are illustrated in FIG. 9. Thus, the depiction of the system 900 in FIG. 9 should be taken as being illustrative in nature, and not limiting to the scope of the disclosure.

The various embodiments further can be implemented in a wide variety of operating environments, which in some cases can include one or more user computers, computing devices, or processing devices which can be used to operate any of a number of applications. User or client devices can include any of a number of general purpose personal computers, such as desktop or laptop computers running a standard operating system, as well as cellular, wireless, and handheld devices running mobile software and capable of supporting a number of networking and messaging protocols. Such a system also can include a number of workstations running any of a variety of commercially-available operating systems and other known applications for purposes such as development and database management. These devices also can include other electronic devices, such as dummy terminals, thin-clients, gaming systems, and other devices capable of communicating via a network.

Most embodiments utilize at least one network that would be familiar to those skilled in the art for supporting communications using any of a variety of commercially-available protocols, such as TCP/IP, OSI, FTP, UPnP, NFS, CIFS, and AppleTalk. The network can be, for example, a local area network, a wide-area network, a virtual private network, the Internet, an intranet, an extranet, a public switched telephone network, an infrared network, a wireless network, and any combination thereof.

In embodiments utilizing a Web server, the Web server can run any of a variety of server or mid-tier applications, including HTTP servers, FTP servers, CGI servers, data servers, Java servers, and business application servers. The server(s) also may be capable of executing programs or scripts in response requests from user devices, such as by executing one or more Web applications that may be implemented as one or more scripts or programs written in any programming language, such as Java®, C, C# or C++, or any scripting language, such as Perl, Python, or TCL, as well as combinations thereof. The server(s) may also include database servers, including without limitation those commercially available from Oracle®, Microsoft®, Sybase®, and IBM®.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network ("SAN") familiar to those skilled in the art. Similarly, any necessary files for performing the functions attributed to the computers, servers, or other network devices may be stored locally and/or remotely, as appropriate. Where a system includes computerized devices, each such device can include hardware elements that may be electrically coupled via a bus, the elements including, for example, at least one central processing unit (CPU), at least one input device (e.g., a mouse, keyboard, controller, touch screen, or keypad), and at least one output device (e.g., a display device, printer, or speaker). Such a system may also include one or more storage devices, such as disk drives, optical storage devices, and solid-state storage devices such as random access memory ("RAM") or read-only memory ("ROM"), as well as removable media devices, memory cards, flash cards, etc.

Such devices also can include a computer-readable storage media reader, a communications device (e.g., a modem, a network card (wireless or wired), an infrared communication device, etc.), and working memory as described above. The computer-readable storage media reader can be connected with, or configured to receive, a computer-readable storage medium, representing remote, local, fixed, and/or removable storage devices as well as storage media for temporarily and/or more permanently containing, storing, transmitting, and retrieving computer-readable information. The system and various devices also typically will include a number of software applications, modules, services, or other elements located within at least one working memory device, including an operating system and application programs, such as a client application or Web browser. It should be appreciated that alternate embodiments may have numerous variations from that described above. For example, customized hardware might also be used and/or particular elements might be implemented in hardware, software (including portable software, such as applets), or both. Further, connection to other computing devices such as network input/output devices may be employed.

Storage media and computer readable media for containing code, or portions of code, can include any appropriate media known or used in the art, including storage media and communication media, such as but not limited to volatile and non-volatile, removable and non-removable media implemented in any method or technology for storage and/or transmission of information such as computer readable instructions, data structures, program modules, or other data, including RAM, ROM, EEPROM, flash memory or other memory technology, CD-ROM, digital versatile disk (DVD) or other optical storage, magnetic cassettes, magnetic tape, magnetic disk storage or other magnetic storage devices, or any other medium which can be used to store the desired information and which can be accessed by the a system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the invention as set forth in the claims.

What is claimed is:

1. A method of marketing billboards, comprising:
   receiving a first set of images from a plurality of capture devices each positioned with respect to a vehicle in order to capture the images along a route of travel of the vehicle, each of said first set of images being tagged with geographical information corresponding to a location of the vehicle when the image was captured;
   extracting, by one or more computing devices, from the first set of images a second set of images each determined to contain a polygonal shape that potentially corresponds to a billboard;
   analyzing, by the one or more computing devices, at least one attribute of each of the second set of images to remove images having an attribute value that corresponds to an object other than a billboard;
   providing for display to at least one user each of the second set of images and receiving from the at least one user content information indicating whether each image contains a representation of a billboard and, for each image containing a representation of a billboard, a content of the billboard;
   storing the content information to at least one data store, wherein one or more advertisers are able to access billboard listing information based at least in part on the content information to determine at least one billboard on which to place an advertisement;
   for each image of one or more images indicated by the content information to contain a representation of a billboard, obtaining multiple images of the billboard that were captured at different times over a time period;
   analyzing, by the one or more computing devices, the obtained multiple images to at least determine whether the billboard is available for use by a new advertiser; and
   modifying, when determined that the billboard is available for use, the billboard listing information to include information that indicates that the billboard is available for use by a new advertiser when determined that the billboard is available for use by a new advertiser.

2. The method of claim 1, wherein the step of extracting from the first set of images a second set of images each determined to contain a polygonal shape that potentially corresponds to a billboard includes using an image processing algorithm configured to identify polygonal shapes in each image.

3. The method of claim 1, further comprising:
   receiving a search query from an advertiser from the one or more advertisers, the search query including at least one criterion relating to billboard advertising; and
   providing for display a set of results matching that criteria from the content information stored in the at least one data store.

4. The method of claim 3, further comprising:
   receiving a bid from the advertiser to rent an available billboard, said available billboard identified as being potentially available for rent and included in said results of said search;
   presenting the bid to an operator of the available billboard; and
   receiving a response to the bid from the operator.

5. The method of claim 1, further comprising:
   storing historical data for each billboard, the historical data based at least in part on analyzing the obtained multiple images; and
   using the historical data to estimate a value of at least one attribute for the billboard.

6. A method in a computer system of marketing billboards, comprising:
   receiving images from a plurality of capture devices, each of the images captured by one of said capture devices and tagged with geographical information;

determining, by one or more computing devices of the computer system, from the images a set of images each containing at least one representation of at least one billboard;

generating, by the one or more computing devices, information about the billboards by at least:
- for each image of a set of one or more images determined to contain a representation of a billboard, obtaining multiple images of the billboard that were captured at different times over a time period;
- analyzing the obtained multiple images to at least determine whether the billboard is available for use by a new advertiser; and
- modifying, when determined that a billboard from the at least one billboard is available for use, the generated information to include information that indicates that the billboard is available for use by a new advertiser when determined that the billboard is available for use by a new advertiser;

storing the generated information about the billboards in a data store;

searching the data store for billboards according to at least one user-selected criterion; and providing search results to the user, the search results including information about billboards matching said at least one user-selected criterion.

7. The method of claim 6, wherein determining from the images a set of images containing representations of billboards includes:
- processing the images to form a set of potential images, each of the potential images having a characteristic common to images containing representations of billboards; and
- receiving human-provided information concerning each of the potential images to refine the set of potential images to form a refined set of images, each image in the refined set of images containing a representation of a billboard, the billboard being operated by an entity that leases the billboard to advertisers.

8. The method of claim 6, further comprising:
- receiving a bid from the user to rent an available billboard, said available billboard included in said results of said search;
- presenting the bid to an operator of the available billboard; and
- receiving a response to the bid from the operator.

9. The method of claim 6, wherein storing attribute values of the billboards comprises:
- for each of said billboards, storing historical data for the billboard; and
- using the historical data to estimate a value of at least one attribute.

10. The method of claim 6, further comprising receiving information about an operator's billboard from the operator, and wherein storing attribute values of the billboards includes updating a data record in the data store according to the information.

11. A billboard marketing system, comprising:
- a communication device configured to receive a plurality of images each captured by an image capture device positioned with respect to a vehicle;
- a data store configured to store data associated with a plurality of billboards;
- one or more processors; and
- a memory device including instructions that, when executed by the one or more processors, cause the one or more processors to collectively:
  - generate information about the billboards by at least:
    - for each image of one or more images determined to contain a representation of a billboard, obtaining multiple images of the billboard that were captured at different times over a time period;
    - analyzing the obtained multiple images to at least determine whether the billboard is available for use by a new advertiser; and
    - modifying, when determined that a billboard from the at least one billboard is available for use, the generated information to include information that indicates that the billboard is available for use by a new advertiser when determined that the billboard is available for use by a new advertiser;
  - storing the generated information about the billboards in a data store;
  - execute a search of the data store for billboards according to at least one user-selected criterion; and
  - provide search results to the user, the search results including information about billboards matching said at least one user-selected criterion.

12. The billboard marketing system of claim 11, wherein the instructions include instructions for applying at least one image processing algorithm to determine whether said one of said images has a characteristic indicating that said one of said images potentially contains a representation of a billboard.

13. The billboard marketing system of claim 12, wherein the instructions include instructions for soliciting from a human information about the content of said one of said images when said one of said images has the characteristic indicating that said one of said images potentially contains a representation of a billboard.

14. The billboard marketing system of claim 11, wherein the instructions further cause the one or more processors to receive bid information, the bid information corresponding to a bid to rent a billboard identified in said results, and to provide the bid information to an operator associated with the billboard.

15. The billboard marketing system of claim 11, wherein the instructions include instructions for storing historical data of the billboard in the data store and wherein the value of the attribute is determined from the historical data.

16. A method in a computer system for marketing outdoor advertising spaces, comprising:
- receiving a plurality of images, each image being captured adjacent a respective thoroughfare;
- for each image determined to contain a representation of an outdoor advertising space, obtaining multiple images of the outdoor advertising space that were captured at different times over a time period;
- analyzing, by one or more computing devices of the computer system, the obtained multiple images to at least determine whether the outdoor advertising space is available for use by a new advertiser;
- modifying, when determined that the outdoor advertising space is available for use, data relating to the outdoor advertising space in a data store to include information that indicates that the outdoor advertising space is available for use by a new advertiser when determined that the outdoor advertising space is available for use by a new advertiser;
- receiving from an advertiser at least one criterion for executing a search on the data stored in the data store in order to locate outdoor advertising spaces matching said at least one criterion;

receiving a bid to use at least one outdoor advertising space included in results of said search; and making the bid available to an operator of the at least one outdoor advertising space.

17. The method of claim 16, wherein collecting a plurality of images comprises:

receiving a set of images from a plurality of capture devices;

for each image of the set of images, using an image processing algorithm to determine whether the image has a characteristic indicative of the presence of a representation of an advertising space; and forming a subset of the set from images having said characteristic.

18. The method of claim 16, wherein determining the value of the attribute includes receiving information about the advertising space from a person having viewed the image in which the representation of the advertising space is contained.

19. The method of claim 16, further comprising:

for each of a first plurality of advertising spaces, storing price data in the data store;

using the price data to calculate a market price for a second plurality of advertising spaces; and providing the market price to the advertiser.

20. The method of claim 16, further comprising providing a map to the advertiser, the map including a graphic representing an advertising space associated with at least one of said results of said search, the graphic located on the map in a location corresponding to a geographical location of the advertising space.

21. A system for marketing advertising spaces, comprising;

a communication device configured to communicate with a plurality of capture devices of a plurality of vehicles each configured to capture images from the vehicles and provide geographical data for each of the images;

a data store;

one or more processors; and a memory device including instructions that, when executed by the one or more processors, cause the one or more processors to collectively at least:

select, from the images, a subset of images containing representations of advertising spaces;

generate information about the advertising spaces by at least:

for each advertising space of at least a subset of the advertising spaces, obtaining multiple images of the advertising space that were captured at different times over a time period;

analyzing the obtained multiple images to at least determine whether the advertising space is available for use by a new advertiser; and modifying, when determined that the advertising space is available for use, the generated information to include information that indicates that the advertising space is available for use by a new advertiser when determined that the advertising space is available for use by a new advertiser;

cause the generated information about the advertising spaces represented in the subset of images to be stored in the data store; and based at least in part on the information stored in the data store, cause instructions for capturing additional images to be communicated to at least one of said capture devices.

22. The system of claim 21, wherein the communication device is configured to communicate with an advertiser over a communications network in order to receive at least one criterion for an advertising space search from the advertiser and to provide results of the advertising space search to the advertiser.

23. The system of claim 21, wherein the memory device further includes instructions that, when executed by the processor, cause the processor to analyze the subset of images to determine at least one operator of the advertising spaces.

24. The system of claim 21, wherein the memory device further includes instructions that, when executed by the processor, cause the processor to use information stored in the data store to estimate a value of an attribute of at least one advertising space.

25. The system of claim 21, wherein the memory device further includes instructions that, when executed by the processor, cause the processor to:

use the information in the data store to create capture device instructions that, when executed on a processor of one of said capture devices, cause the capture device to capture images according to the instructions; and cause the capture device instructions to be communicated to the capture device.

* * * * *